United States Patent
Rogers et al.

(10) Patent No.: US 8,341,743 B2
(45) Date of Patent: Dec. 25, 2012

(54) DETECTION OF VIRAL CODE USING EMULATION OF OPERATING SYSTEM FUNCTIONS

(75) Inventors: Antony John Rogers, Rowville (AU); Trevor Yann, Rowville (AU); Myles Jordan, Rowville Melbourne (AU)

(73) Assignee: CA, Inc., Islandia, NY (US)

( * ) Notice: Subject to any disclaimer, the term of this patent is extended or adjusted under 35 U.S.C. 154(b) by 2012 days.

(21) Appl. No.: 09/905,532

(22) Filed: Jul. 14, 2001

(65) Prior Publication Data

US 2002/0083334 A1   Jun. 27, 2002

Related U.S. Application Data

(60) Provisional application No. 60/218,467, filed on Jul. 14, 2000.

(51) Int. Cl.
*H04L 29/06* (2006.01)
(52) U.S. Cl. .......................................... 726/24; 713/188
(58) Field of Classification Search .................. 713/200, 713/187, 188; 726/24
See application file for complete search history.

(56) References Cited

U.S. PATENT DOCUMENTS

| | | | | |
|---|---|---|---|---|
| 5,398,196 A * | 3/1995 | Chambers | ........................ | 714/28 |
| 5,623,600 A * | 4/1997 | Ji et al. | ........................... | 713/201 |
| 5,826,013 A * | 10/1998 | Nachenberg | .................... | 726/22 |
| 5,832,208 A * | 11/1998 | Chen et al. | ....................... | 726/24 |
| 5,842,002 A * | 11/1998 | Schnurer et al. | ................. | 703/21 |
| 5,974,549 A * | 10/1999 | Golan | ........................... | 713/200 |
| 6,192,512 B1 * | 2/2001 | Chess | ........................... | 717/127 |
| 6,308,274 B1 * | 10/2001 | Swift | .................................. | 726/9 |
| 6,324,627 B1 * | 11/2001 | Kricheff et al. | ................ | 711/163 |
| 6,338,141 B1 * | 1/2002 | Wells | ............................... | 726/24 |
| 6,357,008 B1 * | 3/2002 | Nachenberg | ................... | 713/200 |
| 6,480,962 B1 * | 11/2002 | Touboul | ........................ | 713/200 |
| 6,499,137 B1 * | 12/2002 | Hunt | .............................. | 717/164 |
| 6,851,057 B1 * | 2/2005 | Nachenberg | ..................... | 726/24 |
| 6,971,019 B1 * | 11/2005 | Nachenberg | ................... | 713/188 |
| 6,973,577 B1 * | 12/2005 | Kouznetsov | ..................... | 726/25 |

OTHER PUBLICATIONS

Foldoc, "system call," Mar. 1, 1995, p. 1 <http://foldoc.org/?system+call>.*

* cited by examiner

*Primary Examiner* — Michael Pyzocha
(74) *Attorney, Agent, or Firm* — Baker Botts L.L.P.

(57) ABSTRACT

A method and apparatus for detecting viral code that uses calls to an operating system to damage computer systems, computers and/or computer files is provided. The apparatus comprises a CPU emulator, a memory manager component and a monitor component. An artificial memory region spanning one or more components of the operating system is created by the memory manager component. Execution of computer executable code in a subject file is emulated by the CPU emulator. An attempt by the emulated computer executable code to access the artificial memory region is detected by the monitor component. The apparatus optionally may comprise an auxiliary component and an analyzer component. The auxiliary component determines an operating system call that the emulated computer executable code attempted to access. The analyzer component monitors the operating system call to determine whether the computer executable code is viral.

15 Claims, 4 Drawing Sheets

DETECTION OF VIRAL CODE USING EMULATION OF OPERATING SYSTEM FUNCTIONS

CROSS-REFERENCE TO RELATED APPLICATIONS

This application claims the benefit of provisional application Ser. No. 60/218,467, filed Jul. 14, 2000 and entitled "DETECTION OF MALICIOUS CODE USING EMULATION OF OPERATING SYSTEM FUNCTIONS."

TECHNICAL FIELD

The disclosure relates to the detection of computer viruses. More specifically, the disclosure relates to the detection of viral code that uses operating system calls to damage computer systems, computers and/or computer files.

DESCRIPTION OF RELATED ART

Computer viruses are a major problem in modern day computing. Generally, a computer virus is a computer program or some unit of computer executable code, e.g., instructions to which a computer responds, such as a code block, code element or code segment. When the viral code is executed on a computing device, it typically attaches to other programs or sets of computer instructions and/or replicates itself. In this way, the virus exists within and "infects" otherwise normal programs. Another typical objective of a computer virus is to perform unsolicited actions on the target computer, without the knowledge and authorization of the computer user, and thereby perform unwanted, and also possibly harmful, actions on components of the computer and/or information stored on the computer.

Some viral code may cause damage to an infected computer and/or information stored on the computer, or prevents the computer from being used in its normal manner. For example, some viruses alter or destroy data or program files stored on, for example, the hard drive of the infected computer, which typically results in considerable downtime for the computer. Additionally, in some instances the integrity of an organization's computer database(s) is attacked, and the organization, without notice of the data corruption, continues operation using inaccurate data. Even if corrupted data is detected, the organization often has to, upon discovery of the problem, take time to recover its database before it may continue its normal operation.

Frequently, the viral code resides in a file containing computer executable code comprising a collection of computer instructions. Each time the infected code runs on a computing device/system, the virus code has the opportunity to spread and do its damage on the device/system. For example, the virus may spread by adding itself to computer executable code in some other program on a computer, then changing the preexisting code in such a way that the newly added viral code may be executed to further replicate itself in yet another program. Infected programs can exist anywhere in the computer system or even the operating system itself, and if not detected can cause potentially devastating problems.

The virus also may spread from one computer file to another, and from one machine to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

Assorted techniques have been proposed to detect and/or foil viruses. One such technique involves scanning suspect files or programs for known virus signatures or byte strings. A virus signature is a pattern of (not necessarily sequential) characters or instructions that is found in each instantiation of the associated virus. A virus scanner searches potential host files or programs for a set of one or more signatures that are indicative of particular known viruses. The scanning is performed by a separate program external to the files or programs being examined. Another technique is emulating and heuristically analyzing the execution flow of the potentially infected code. A combination of these may be used as well.

Many computer viruses use operating system calls to replicate. Such viruses may look for major components of an operating system to locate entry points to operating system calls. Such stealthy access to operating system calls usually obfuscates simple scanning by conventional anti-virus tools.

SUMMARY

The disclosure provides a method of detecting in a subject file viral code that uses calls to an operating system. In one embodiment, the method comprises creating an artificial memory region spanning one or more components of the operating system, emulating execution of computer executable code in the subject file, and detecting when the emulated computer executable code attempts to access the artificial memory region. The method, in accordance with another embodiment, further may comprise determining an operating system call that the emulated code attempted to access, and monitoring the operating system call to determine whether the code is viral.

The method further may comprise emulating functionality of the operating system call while monitoring the operating system call to determine whether the computer executable code is viral. The method further may comprise monitoring accesses by the emulated computer executable code to the artificial memory region to detect looping. The method further may comprise monitoring access by the emulated computer executable code to dynamically linked functions. The artificial memory region may span a jump table containing pointers to the dynamically linked functions.

The disclosure also provides apparatus for detecting in a subject file viral code that uses calls to an operating system. In one embodiment, the apparatus comprises a CPU emulator, a memory manager component and a monitor component. The memory manager component creates an artificial memory region that spans one or more major components of the operating system. The CPU emulator emulates execution of computer executable code in the subject file. The monitor component detects when the emulated code attempts to access an artificial memory region. The apparatus, in accordance with another embodiment, further comprises an auxiliary component and an analyzer component. The auxiliary component determines an operating system call that the emulated computer executable code attempted to access. The analyzer component monitors the operating system call to determine whether the computer executable code is viral, while emulation continues.

The artificial memory region may span an export table of one or more predetermined operating system components. A custom version of an export table with predetermined values for the entry points may be created.

BRIEF DESCRIPTION OF THE DRAWINGS

The features of the present disclosure can be more readily understood from the following detailed description with reference to the accompanying drawings wherein.

DETAILED DESCRIPTION

The present disclosure provides tools (in the form of apparatus, systems and methods) for detecting viral code that use operating system calls to damage computer systems, computers and/or computer files (also referred to herein either separately or collectively as "computing systems"). More particularly, the present disclosure provides a methodology for detection of viral code that attempts to avoid detection by making its operating system calls indirectly. It should be noted that the apparatus, systems and methods according to the present disclosure analyzes (e.g., monitors) files containing executable code to be executed by a computer system or computer, so that each file being analyzed is also referred to herein as a "subject file". Viral code may look for major operating system components to obtain addresses of required operating system functions, and then call the operating system functions directly using those addresses. There is little reason for legitimate computer executable code to use such circuitous mechanisms to call the operating system. Thus, detecting such access is a strong indicator that the computer executable code in question is viral. The presence of such viral code in a subject file may be detected by scanning the list of operating system calls by the computer executable code in the subject file and identifying operating system calls that likely are used by viral code to damage the computing system.

Figure 1:
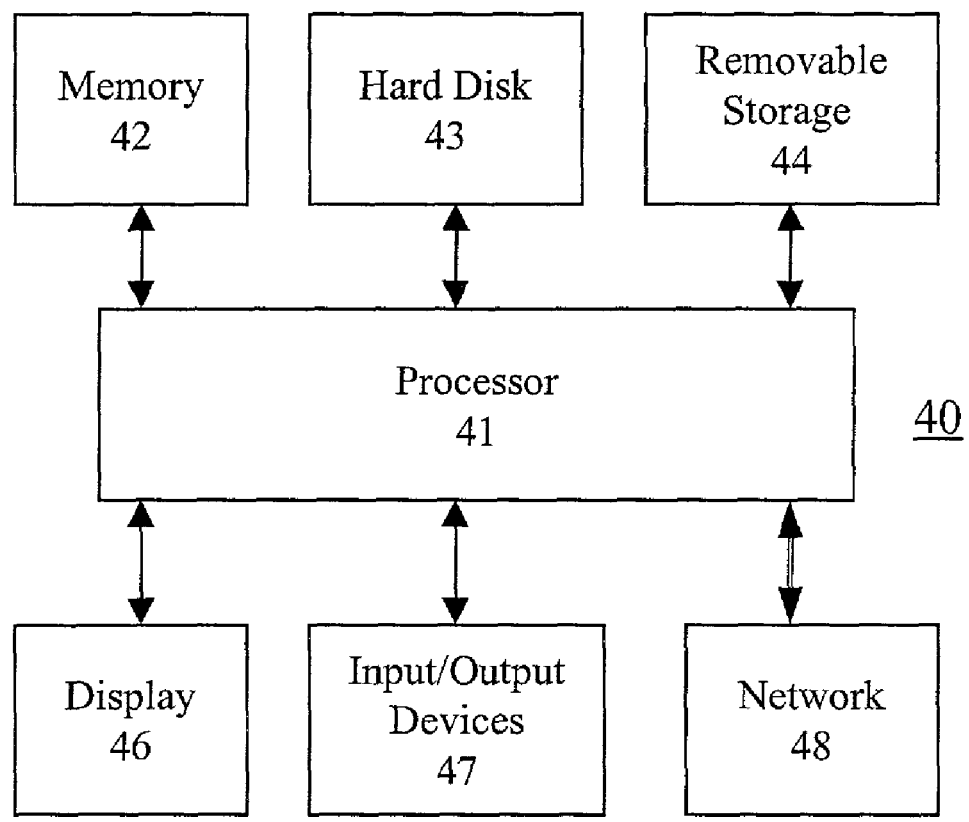
FIG. 1 shows a block diagram of a typical computing system/device that may be a target of a computer virus.

FIG. 1 illustrates a computer system or computer 40 on which computer executable code may execute and/or reside (and which thus may be a target of the viral code). Computer system 40 comprises a processor 41, memory 42, hard disk 43, removable storage drive 44 (for reading/accessing removable storage media, such as floppy disks, CDs, DVDs, etc.), display 46, I/O devices 47 (for example, keyboard, mouse, microphone, speaker, etc.), and a wired or wireless connection to a network 48. The network can be, for example, a LAN, a WAN, an intranet, an extranet, the Internet, and/or any combinations of such networks. Computer 40 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system"). Subject files may reside on/in, for example, hard disk 43 and/or a removable storage medium that may be read/accessed through removable storage drive 44. Also, the subject computer executable code may be downloaded to the computer system or computer through network 48.

Figure 2:
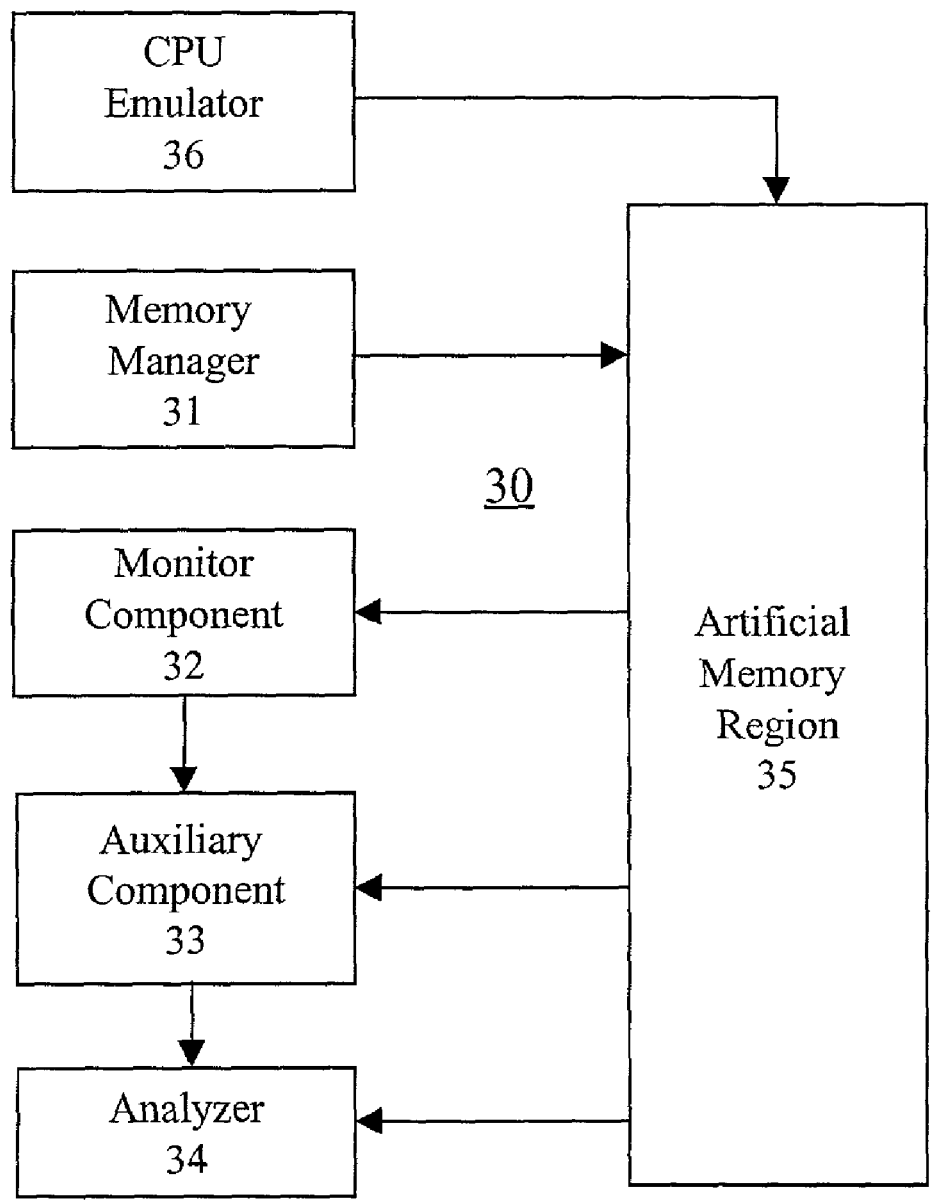
FIG. 2 shows a block diagram of an apparatus for detecting computer viruses that use operating system calls to propagate, in accordance with an embodiment of the present disclosure.

An apparatus, in accordance with an embodiment of the present disclosure, for detecting viral code that uses calls to an operating system to damage computer systems, computers and/or computer files is shown in FIG. 2. The apparatus 30 includes CPU emulator 36, memory manager component 31 and monitor component 32. Optionally, the apparatus 30 may also include an auxiliary component 33 and analyzer component 34.

Figure 3:
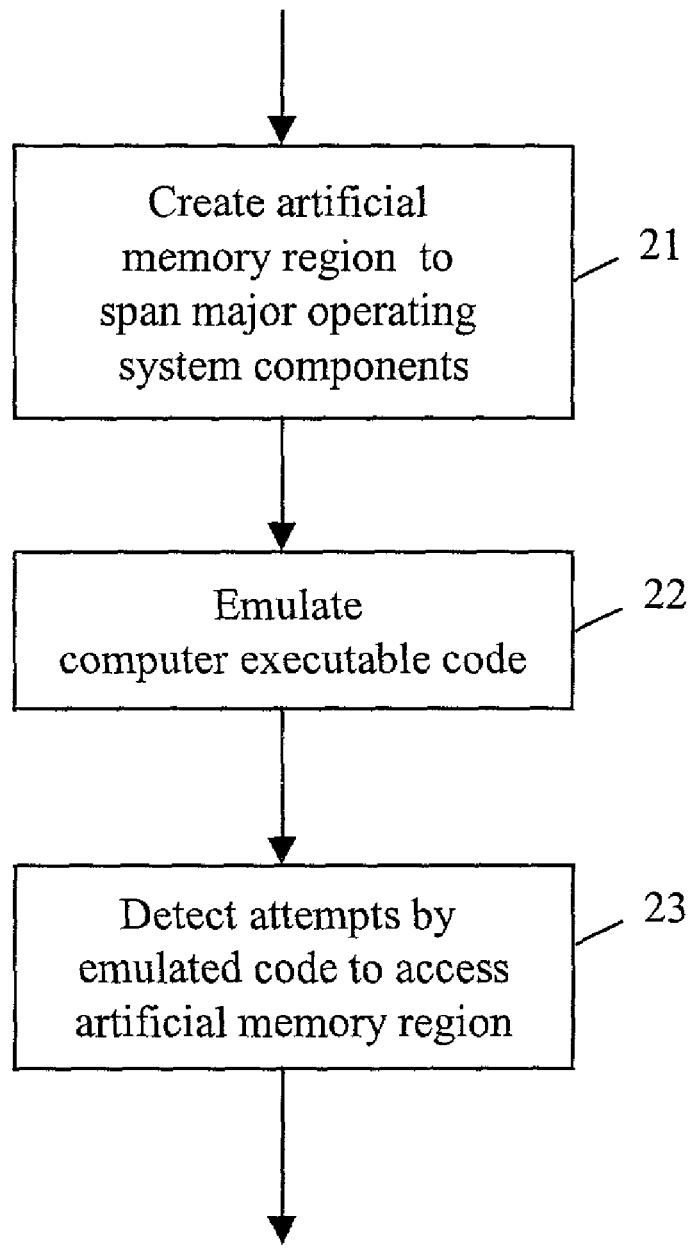
FIG. 3 shows a flow chart of a process for detecting computer viruses that use operating system calls to propagate, in accordance with an embodiment of the present disclosure.

Referring to FIGS. 2 and 3, one embodiment according to the present disclosure provides a method for detecting viral code that uses calls to an operating system to damage computer systems, computers and/or computer files will be described. In this embodiment, an artificial memory region 35 spanning one or more components of the operating system is created by memory manager component 31 (step 21). Once the artificial memory region is created, execution of computer executable code in a subject file is emulated by the CPU emulator 36 (step 22). Attempts by the emulated computer executable code to scan the newly created artificial memory region are detected by monitor component 32 (step 23), wherein any access to the newly created artificial memory region is immediately suspicious, because a legitimate program has no need to access the artificial memory region. If the monitor component 32 detects attempts to access the newly created artificial memory region, the computer executable code is deemed to be viral.

Figure 4:
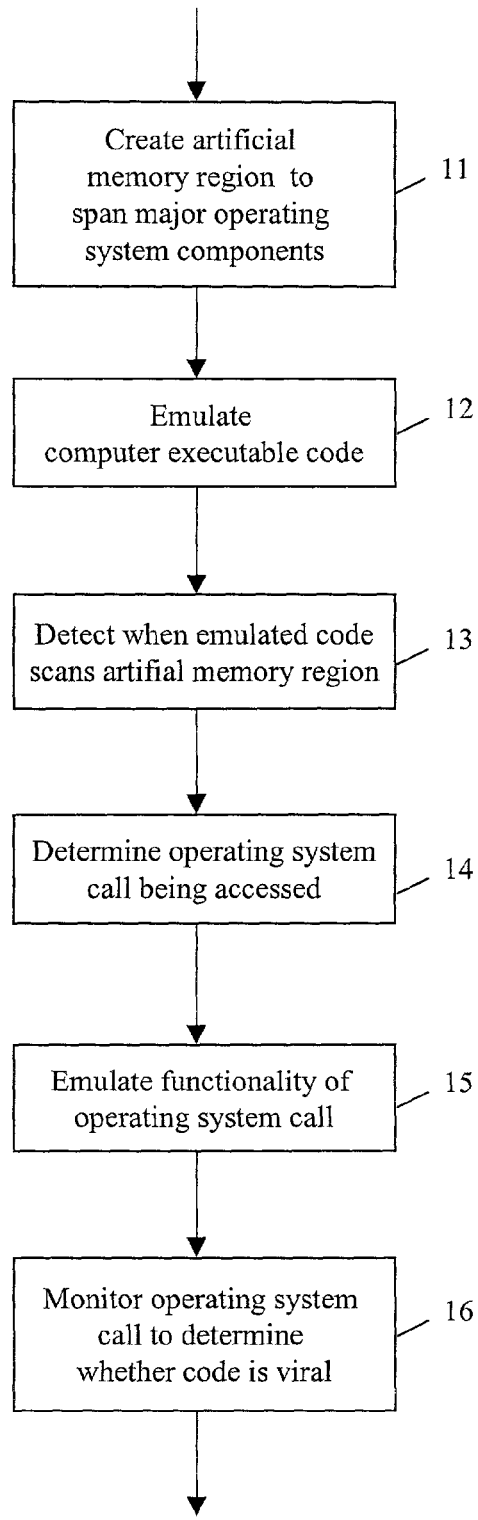
FIG. 4 shows a flow chart of a process for detecting computer viruses that use operating system calls to propagate, in accordance with another embodiment of the present disclosure.

A method for detecting viral code that uses calls to an operating system to propagate to or damage computer systems, computers and/or computer files, in accordance with an alternative embodiment will be described with reference to FIGS. 2 and 4. Initially, the memory manager component 31 creates an artificial memory region 35 that spans an export table of one or more major components of the operating system (step 11). The CPU emulator 36 emulates execution of computer executable code in a subject file (step 12), and the monitor component 32 detects when emulated code attempts to scan the new artificial memory region (step 13). The auxiliary component 33 determines the operating system call that is being accessed by the emulated code (step 14), and emulates the functionality of the operating system call without halting execution of the code (step 15). Since emulation of the code continues, viral code which initially make one or more innocuous operating system calls may be detected at a later point. Analyzer component 34 then monitors the operating system call to determine whether the emulated code is viral (step 16). As an example, the analyzer component 34 may monitor access to the artificially created memory region 35 for various suspect viral characteristics, including looping.

A direct triggering mechanism or an indirect triggering mechanism may be used by the apparatus 30 to detect access by the emulated code to an export table of relevant operating system components. It should be noted that the operation of the apparatus is independent of the operating system being monitored.

The functionality of monitoring artificially created memory regions permits the apparatus to monitor operating systems that map key operating system functionality into the memory space. The functions monitored include, but are not limited to, file, process and module handling. The apparatus may be adapted with other functionalities to detect suspicious (e.g., viral code) calls to operating systems which use other mechanisms (such as system traps) to access operating system calls.

An exemplary embodiment of the present disclosure as implemented on a Win32 platform, which includes Windows95, Windows98, Windows2000, Windows NT, Windows CE and Windows ME will be described below. Each of these operating systems provides key operating system functions by way of entry points in the Kernel32 DLL.

To detect any attempt to access the functionalities in the Kernel32 DLL, a region covering the entire export table in the emulated Kernel32 DLL is added to the memory manager. By adding an artificial memory region, any access to the artificial memory region is immediately suspicious, because a legitimate program has no need to access the artificial memory region. Operating system functions can and should be accessed via the program's import table, or through use of the GetProcAddress system call.

Detecting access to the export table is the first step. The next step is determining the system call that the code attempted to locate. A custom version of the export table, with pre-selected or predetermined values for the entry points, may be provided. This simplifies the process of converting calls to these operating system functions into identified system calls, and allows the emulator to simulate the effect of calling those functions. This part of the emulation may be driven by data tables, which can be replaced easily should it prove necessary to emulate additional calls for combating new viruses.

The technique described above provides a mechanism for detecting unusual access to functions in dynamically linked libraries. The libraries are mapped into an address space of an application, and are usually accessed through information generated by a linker when an executable is created. A program loader initializes a jump table to refer to the location where each function has been mapped into the application address space. Access to these dynamically linked functions is normally done via the jump table, but it is possible to directly call functions if it can be determined where in the address space the library functions have been mapped.

Many of the documented operating systems that function on the Windows platforms (from Windows 1.0 up to and including Windows 2000 and Windows ME) are accessed through dynamically linked libraries. Therefore, it is possible to detect operating system functions that are called in an unusual fashion. Many non-operating system functions also are accessed through dynamically linked libraries, and the method described above also would allow us to check for unusual access to these functions. In addition, Macintosh platforms support dynamically linked libraries. Therefore, the method described above for detecting viral code that uses calls to an operating system to propagate also may be adapted, as would be apparent to persons of ordinary skill in the art after reading this disclosure, the drawings and the appended claims, to apply to such platforms. In addition, modern Unix-based platforms support and use dynamic libraries, and so the method described above may be adapted for detecting unusual access to functions in dynamic libraries on such platforms. Most flavors of the Unix operating systems do not access base operating system functions through dynamic libraries, but often the runtime library is a dynamically linked library. The method described above may be adapted to detect unusual access to runtime library functions.

The apparatus and methods described above may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 1.

The viral code detection methodologies described herein may be performed by a computer in one or a combination of the following circumstances. The viral code detection methodologies may be performed periodically (e.g., once/twice per day) or at selected times (e.g., each time the computer is powered up or restarted) by the computer on all relevant electronic files. In addition, the viral code detection methodologies may be performed on a file (or a data stream received by the computer through a network) before the file is stored/copied/executed/opened on the computer.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, the above-described apparatus may be integrated with selected artificial intelligence techniques. For example, the analyzer component may be a rule-based module and/or adapted with other artificial intelligence techniques to determine whether the code is viral. Further, a rule-based analyzer component may include a learning sub-component. When the apparatus determines that the subject code includes viral code, the positive identification of viral code may be fed back to the learning component for fortifying the rules in the rule base and/or adding additional rules.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";

(b) Ser. No. 60/218,333, filed Jul. 14, 2000 and entitled "DETECTION OF SUSPICIOUS PRIVILEGED ACCESS TO RESTRICTED COMPUTER RESOURCES";

(c) Ser. No. 60/218,926, filed Jul. 14, 2000 and entitled "DETECTION OF DECRYPTION TO IDENTIFY ENCRYPTED VIRUS";

(d) Ser. No. 60/218,922, filed Jul. 14, 2000 and entitled "DETECTION OF POLYMORPHIC VIRUS CODE USING DATAFLOW ANALYSIS";

(e) Ser. No. 60/218,467, filed Jul. 14, 2000 and entitled "DETECTION OF MALICIOUS CODE USING EMULATION OF OPERATING SYSTEM FUNCTIONS"; and (f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method of detecting viral code in subject files, comprising:

creating an artificial memory region spanning one or more components of the operating system, wherein the artificial memory region is associated with an export table of a dynamically-linked library;

emulating execution of at least a portion of computer executable code in a subject file;

monitoring attempts by the emulated computer executable code to access the artificial memory region;

in response to detecting an attempt to access the artificial memory region, determining an export table entry in the export table of the dynamically-linked library that is associated with the attempt to access the artificial memory region; and determining based on the export table entry associated with the attempt to access the artificial memory region that the emulated computer executable code is viral.

2. The method of claim 1, further comprising:
emulating functionality of an identified operating system call while monitoring the operating system call to determine whether the computer executable code is viral.

3. The method of claim 1, further comprising monitoring access by the emulated computer executable code to dynamically linked functions.

4. The method of claim 3, wherein the artificial memory region spans a jump table containing pointers to the dynamically linked functions.

5. The method of claim 1, further comprising:
monitoring accesses by the emulated computer executable code to the artificial memory region to detect looping; and determining based on a detection of looping that the emulated computer executable code is viral.

6. The method of claim 1, wherein creating an artificial memory region comprises creating a custom version of the export table with predetermined values for the entry points.

7. The method of claim 1, further comprising:
monitoring access by the emulated computer executable code to dynamically linked functions; and determining based on attempted access to dynamically linked functions that the emulated computer executable code is viral.

8. A program storage device readable by a machine, tangibly embodying a program of instructions executable by the machine to perform method steps for detecting viral code in subject files, the method steps comprising:
creating an artificial memory region spanning one or more components of the operating system, wherein the artificial memory region is associated with an export table of a dynamically-linked library;

emulating execution of at least a portion of computer executable code in a subject file;

monitoring attempts by the emulated computer executable code to access the artificial memory region;

in response to detecting an attempt to access the artificial memory region, determining an export table entry in the export table of the dynamically-linked library that is associated with the attempt to access the artificial memory region; and determining based on the export table entry associated with the attempt to access the artificial memory region that the emulated computer executable code is viral.

9. A computer system, comprising:
a processor; and
a program storage device readable by the computer systems, tangibly embodying a program of instructions executable by the processor to perform method steps for detecting viral code in subject files, the method comprising:
creating an artificial memory region spanning one or more components of the operating system, wherein the artificial memory region is associated with an export table of a dynamically-linked library;

emulating execution of at least a portion of computer executable code in a subject file;

monitoring attempts by the emulated computer executable code to access the artificial memory region; and determining based on the export table entry associated with the attempt to access the artificial memory region that the emulated computer executable code is viral.

10. A computer data signal embodied in a computer-readable medium which embodies instructions executable by a computer for detecting in a subject file viral code that uses calls to an operating system, the signal comprising:
a first segment comprising CPU emulator code, wherein the CPU emulator code emulates execution of at least a portion of computer executable code in the subject file;

a second segment comprising memory manager code, wherein the memory manager code creates an artificial memory region spanning components of the operating system, wherein the artificial memory region is associated with an export table of a dynamically-linked library; and a third segment comprising monitor code, wherein the monitor code:
monitors attempts by the emulated computer executable code to access the artificial memory region;

in response to detecting an attempt to access the artificial memory region, determining an export table entry in the export table of the dynamically-linked library that is associated with the attempt to access the artificial memory region; and determines based on the export table entry associated with the attempt to access the artificial memory region that the emulated computer executable code is viral.

11. The computer data signal of claim 10, further comprising:
a fourth segment comprising analyzer code, wherein the analyzer code emulates functionality of the identified operating system call to determine whether the computer executable code is viral.

12. An apparatus for detecting in a subject file viral code that uses calls to an operating system, comprising:
a processor;
a memory;
a CPU emulator;
a memory manager component that creates an artificial memory region spanning at least a portion of the memory associated with an export table of a dynamically-linked library; and a monitor component, wherein the CPU emulator emulates execution of at least a portion of computer executable code in the subject file, and the monitor component:
monitors attempts by the emulated computer executable code to access the artificial memory region;

in response to detecting an attempt to access the artificial memory region, determining an export table entry in the export table of the dynamically-linked library that is associated with the attempt to access the artificial memory region; and determines based on the export table entry associated with the attempt to access the artificial memory region that the emulated computer executable code is viral.

13. The apparatus of claim 12, further comprising:
an auxiliary component; and
an analyzer component,
wherein the auxiliary component emulates functionalities of an identified operating system call, and the monitor component monitors the operating system call to determine whether the computer executable code is viral, while emulation continues.

14. The apparatus of claim 13, wherein the auxiliary component emulates functionalities of the operating system call.

15. The apparatus of claim 12, wherein the artificial memory region created by the memory manager component spans a jump table containing pointers to dynamically linked functions, and the monitor component monitors access by the emulated computer executable code to the dynamically linked functions.

* * * * *